(12) United States Patent
Terada et al.

(10) Patent No.: US 6,343,682 B1
(45) Date of Patent: Feb. 5, 2002

(54) ONE-WAY CLUTCH

(75) Inventors: Tadahiro Terada, Nara; Hajime Tazumi; Yoshitaka Nakagawa, both of Osaka; Hideki Fujiwara, Nara, all of (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 09/501,833

(22) Filed: Feb. 10, 2000

(30) Foreign Application Priority Data

Feb. 17, 1999 (JP) .......................................... 11-038431

(51) Int. Cl.$^7$ ...................... F16D 41/067; F16D 13/74; C10M 115/08
(52) U.S. Cl. ................. 192/45; 192/113.1; 192/113.32; 508/552
(58) Field of Search .............................. 192/45, 113.32, 192/113.1; 508/552

(56) References Cited

U.S. PATENT DOCUMENTS

| | | |
|---|---|---|
| 3,426,874 A | 2/1969 | Johnston, Jr. |
| 4,115,284 A | 9/1978 | Kinoshita et al. |
| 5,043,085 A * | 8/1991 | Kinoshita et al. ....... 508/552 X |
| 5,728,659 A * | 3/1998 | Nako et al. .................. 508/552 |
| 5,910,470 A * | 6/1999 | Minami et al. ......... 508/552 X |
| 5,915,844 A * | 6/1999 | Nanbu et al. ........... 508/552 X |
| 6,136,762 A * | 10/2000 | Yoshinari et al. ........... 508/552 |

FOREIGN PATENT DOCUMENTS

| | | | |
|---|---|---|---|
| EP | 0869166 | 10/1998 | |
| GB | 450458 | 7/1936 | |
| JP | 1-172642 | * 7/1989 | ................... 195/45 |
| JP | 3-249435 | * 11/1991 | ............ 192/113.32 |
| JP | 1182688 | 3/1999 | |

* cited by examiner

Primary Examiner—Rodney H. Bonck
(74) Attorney, Agent, or Firm—Jordan and Hamburg LLP

(57) ABSTRACT

A one-way clutch has an annular space through which an outer ring and an inner ring face each other, the outer ring and the inner ring being disposed inside and outside each other in a diameter direction and concentrically with each other. A lubricant for lubricating an inner peripheral face of the outer ring and an outer peripheral face of the inner ring on which rollers roll is prepared by mixing a urea-based consistency increasing agent into ester-based or synthetic oil-based base oil with a pressure viscosity coefficient (at a temperature of 25° C.) set at 12 $GPa^{-1}$ or more. The lubricant provides for movement of state switching components to be stabilized even at a low temperature and wear of the state switching components and operating faces can be suppressed even at a high temperature.

40 Claims, 3 Drawing Sheets

F I G. 4
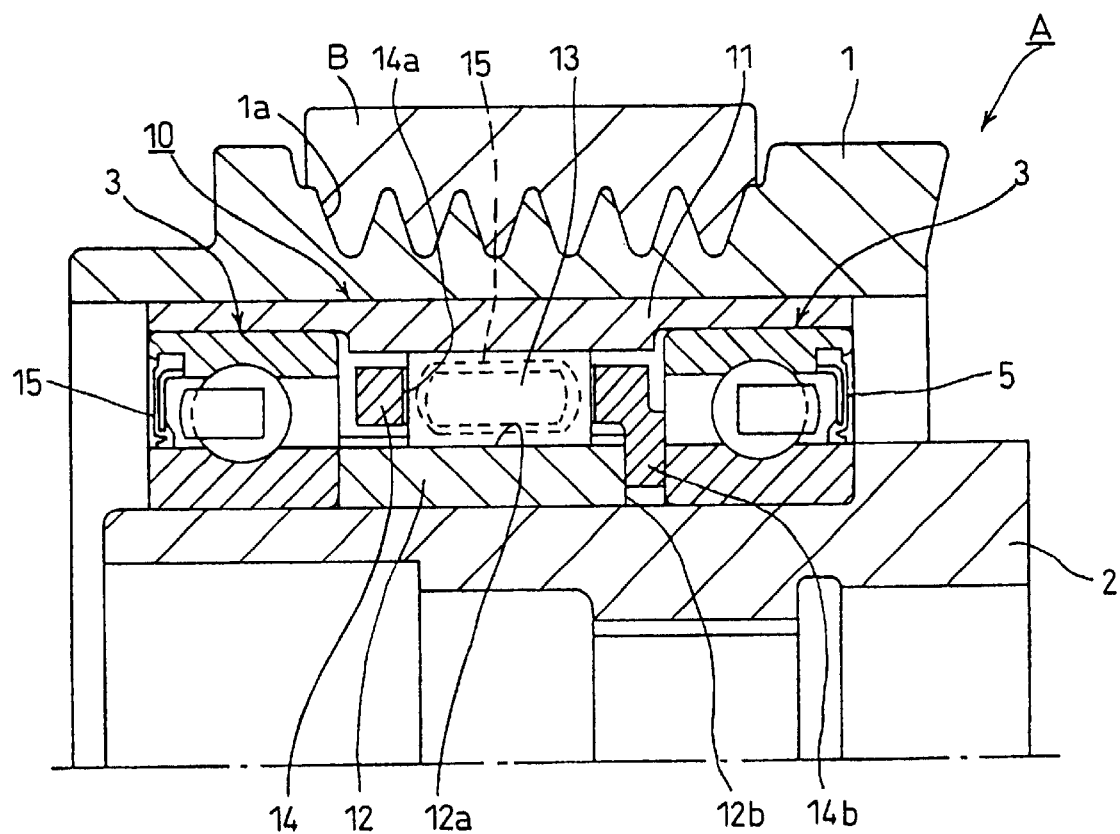

ONE-WAY CLUTCH

BACKGROUND OF THE INVENTION

The present invention relates to a one-way clutch. The one-way clutch is used for a pulley of auxiliary machinery such as a feed mechanism for various equipment, an alternator for an automobile, and a compressor, a water pump, and a cooling fan for an air conditioner, for example.

Some one-way clutches are of a type disposed between an outer ring and an inner ring which are disposed inside and outside each other in a diameter direction and concentrically with each other. The clutch functions by switching between a lock state in which the outer ring and the inner ring are rotated synchronously with each other and a free state in which the outer ring and the inner ring are rotated with respect to each other.

Such one-way clutches include a type of clutch employing rollers for the above clutch function. The rollers of this type of one-way clutch are disposed in wedge-shaped spaces formed at some positions on a circumference of a space in a diameter direction and through which the inner and outer rings face each other. A gap in each of the wedge-shaped spaces in the diameter direction narrows in one direction in a circumferential direction. Through the wedge-shaped spaces, cam faces of the outer ring and an outer peripheral face of the inner ring face each other. The cam faces have recessed curved faces which are recessed outwardly in the diameter direction. The cam faces are provided at some positions on a circumference of an inner peripheral face of the outer ring and the outer peripheral face of the inner ring being disposed on an inner side of the outer ring in the diameter direction.

In the above one-way clutch, the lock state is obtained by rolling the rollers to narrower sides of the wedge-shaped spaces to engage the rollers with the cam faces of the outer ring and the outer peripheral face of the inner ring. The cam faces are operating faces for the rollers and to integrate the outer ring with the inner ring. In this case, the engagement can be achieved by friction forces of the rollers against the operating faces.

In such a one-way clutch, a lubricant is used to lubricate the rollers and the operating faces thereof in order to improve abrasion resistance. In this case, although the lubricant is effective at improving the abrasion resistance, an engaging property is reduced and the switching operation of the one-way clutch becomes unstable if the lubrication works excessively in the lock state.

By using urea-based grease which is conventional as a lubricant, both the abrasion resistance and engaging property can be obtained in a relatively narrow range of temperature, but it is hard to obtain both in a wide range of temperature from a low temperature to a high temperature. Specifically, the engaging property of the rollers is poor at the low temperature while the abrasion resistance is poor at the high temperature.

According to the present invention, a one-way clutch is mounted to an alternator and allows rotation of a rotor of the alternator to continue by an inertial force of the rotor when a rotation speed of the crankshaft decreases, thereby improving power generation efficiency. According to such a structure, the abrasion resistance is likely to decrease because vibration of an engine is transmitted almost all of the time to a pulley of the alternator through a belt for rotating the pulley.

SUMMARY OF THE INVENTION

Therefore, it is a main object of the present invention to provide a one-way clutch in which an operation of switching between lock and free states in a wide range of temperature from a low temperature to a high temperature is stable.

It is another object of the invention to provide a one-way clutch in which both an engaging property and abrasion resistance are obtained in the wide range of temperature.

It is yet another object of the invention to provide a one-way clutch in which movement of rollers is stable even at a low temperature and the abrasion resistance of the rollers and operating faces of the rollers is improved even at a high temperature.

Other objects, features, and advantages of the invention will become apparent from the descriptions below.

According to the invention, a one-way clutch includes an outer ring, an inner ring disposed inside the outer ring in a diameter direction and concentrically with the outer ring. The one-way clutch also has a state switching component for switching between a lock state in which the outer ring and the inner ring are rotated synchronously with each other and a free state in which the outer ring and the inner ring are rotated with respect to each other. The one-way clutch further includes a lubricant for lubricating an operating portion of the state switching component, wherein the lubricant is prepared by mixing a urea-based consistency increasing agent into ester-based or synthetic oil-based base oil with a pressure viscosity coefficient (at a temperature of 25° C.) set at 12 $GPa^{-1}$ or more.

In the invention, because of the selection of ingredients used in the lubricant, movement of the state switching component is stabilized even at low temperature and the state switching component and the operating faces are less likely to wear even at high temperature.

Preferably, the state switching component is a roller disposed for rolling in a wedge-shaped space formed between an inner peripheral face of the outer ring and an outer peripheral face of the inner ring. In this case, the roller is less likely to slip when rolling against a narrower side of the wedge-shaped space.

Preferably, a ratio of the base oil and the consistency increasing agent mixed to prepare the lubricant is set such that the lubricant has a consistency in a range of 240 to 310 (at a temperature of 25° C.) and a traction coefficient of 0.02 or more (at a temperature of 25° C.). As a result, the movement of the state switching component, for example, the roller is further stabilized.

BRIEF DESCRIPTION OF THE DRAWINGS

These and other objects as well as advantages of the invention will become clear by the following description of preferred embodiments of the invention with reference to the accompanying drawings, wherein:

FIG. 4 is a vertical sectional side view of a pulley unit incorporating the one-way clutch of the above embodiment.

DETAILED DESCRIPTION OF THE INVENTION

Figure 1:
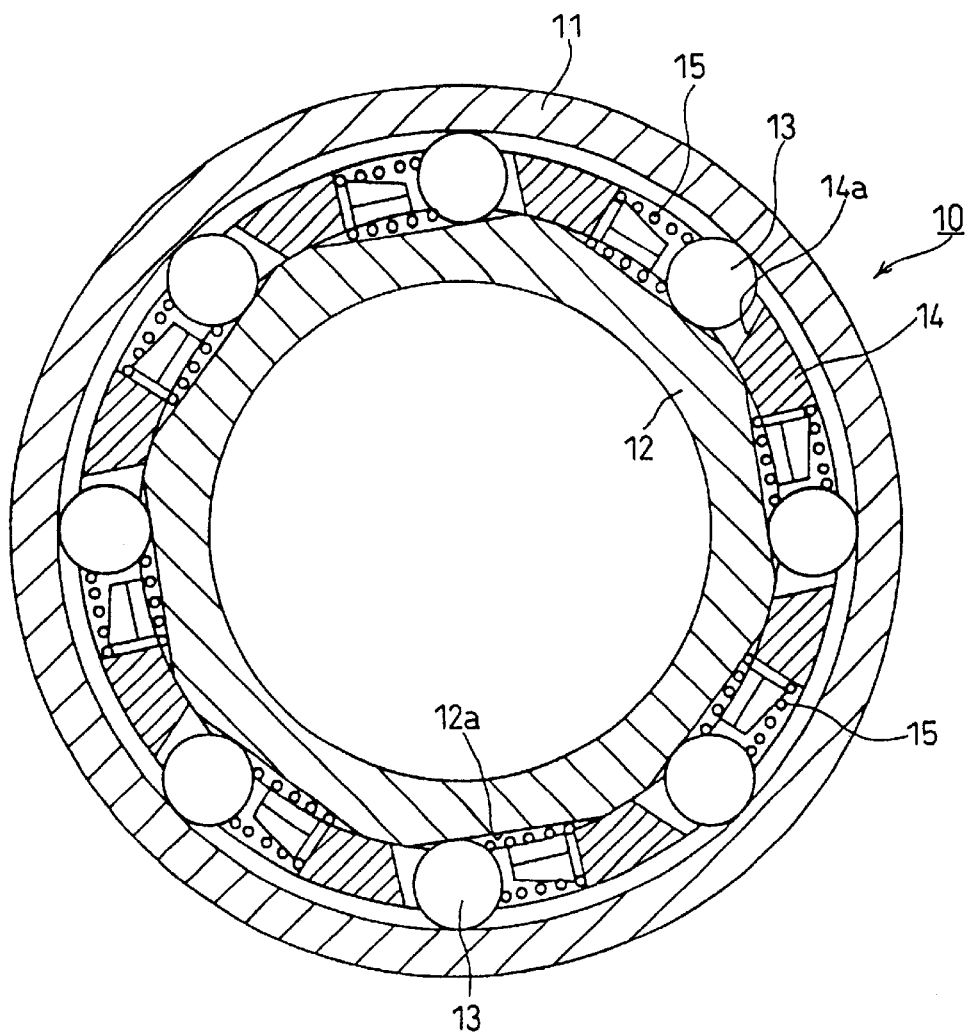
FIG. 1 is a vertical sectional front view of a one-way clutch of an embodiment of the present invention.
Figure 2:
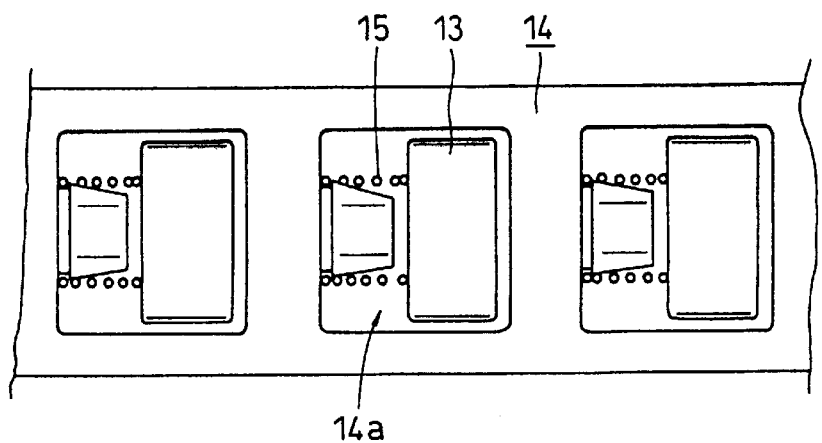
FIG. 2 is a plan view showing a portion of the one-way clutch in FIG. 1.
Figure 3:
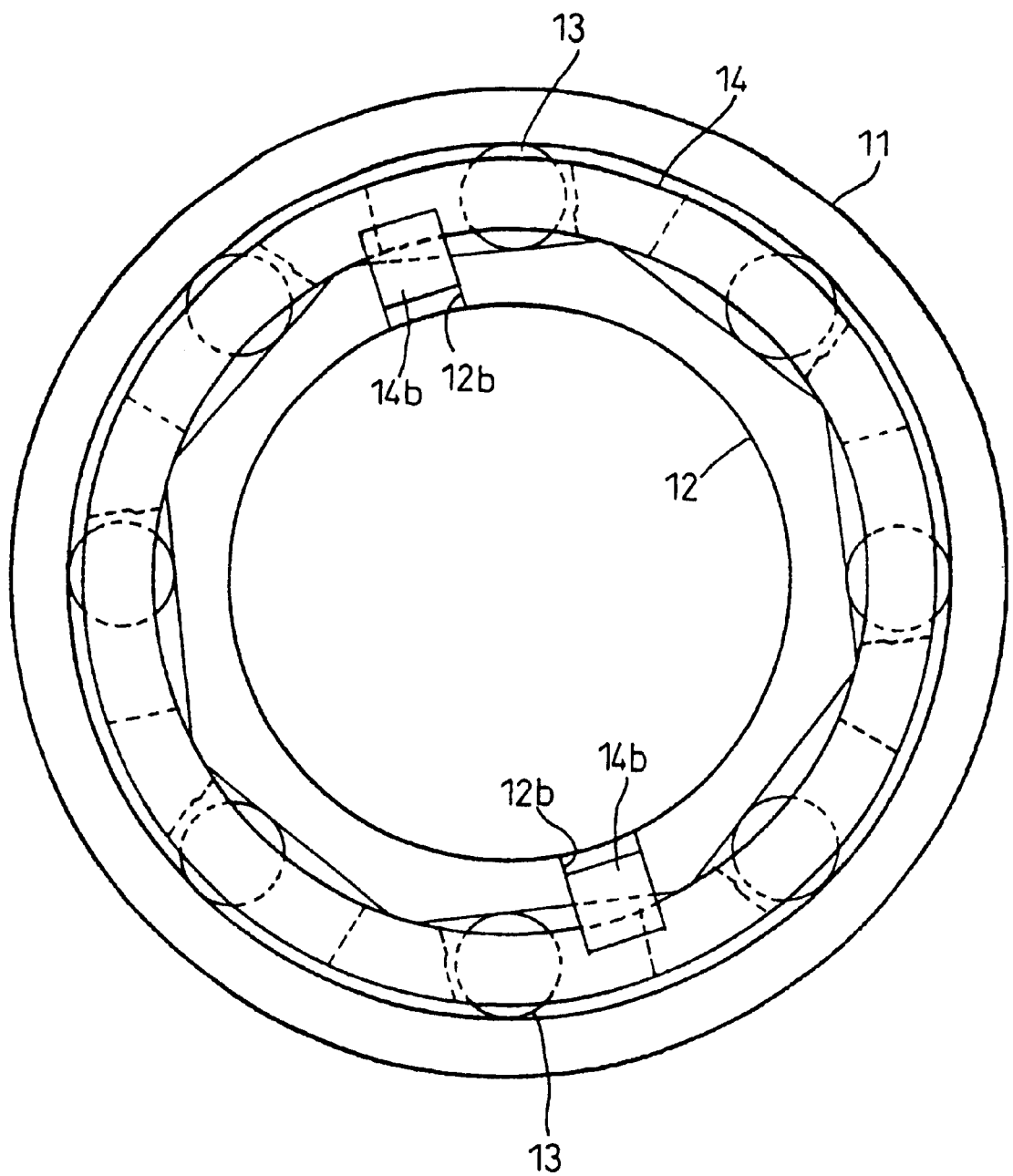
FIG. 3 is a front view of the one-way clutch in FIG. 1.

With reference to FIGS. 1 to 4, a one-way clutch according to a preferred embodiment of the present invention is described below in detail.

A one-way clutch 10 has an outer ring 11, an inner ring 12 disposed inside the outer ring 11 in a diameter direction and concentrically with the outer ring 11, a plurality of rollers 13 disposed between an inner peripheral face of the outer ring 11 and an outer peripheral face of the inner ring 12. The one-way clutch further includes a cage 14 for retaining the respective rollers 13, and a plurality of coil springs 15 disposed to individually correspond to each roller 13 for biasing each corresponding roller 13 in one direction in a circumferential direction.

The inner peripheral face of the outer ring 11 has a circular shape in section. The outer peripheral face of the inner ring 12 is formed with flat key-shaped cam faces 12a at equal intervals on a circumference, thereby giving the inner ring 12 a polygonal shape in section. However, a cylindrical shape remains partially between the respective adjacent cam faces 12a in the circumferential direction.

Consequently, a plurality of wedge-shaped spaces each narrowing in one direction in the circumferential direction are formed between the inner peripheral face of the outer ring 11 and the respective cam faces 12a of the inner ring 12. The inner peripheral face of the outer ring and the cam faces 12a facing each other.

Each roller 13 is disposed for rolling in both directions in the circumferential direction in each wedge-shaped space.

The cage 14 is fitted to an outside of the outer peripheral face of the inner ring 12 to contact the cylindrical portions remaining partially in the circumferential direction.

The cage 14 has pockets 14a extending to open inside and outside in a diameter direction at areas corresponding to the respective cam faces 12a of the inner ring 12. Each roller 13 is individually housed by each pocket 14a.

The cage 14 is fixed to the inner ring 12 by fitting of projecting portions 14b provided to one end in an axial direction into slit-shaped recessed portions 12b provided to the inner ring 12.

The plurality of coil springs 15 are housed by and disposed within the respective pockets 14a of the cage 14 in a state in which each the coil spring 15 is compressed and adjacent to the roller 13 in the circumferential direction. Each coil spring 15 pushes each roller 13 in one direction in the circumferential direction, i.e., toward a narrower side of the wedge-shaped space by its extension restoring force. The coil spring 15 has a shape of an ellipse when seen from an end face in the circumferential direction so as to avoid skewing of the roller 13. Thus, the coil spring 15 contacts with as large an area as possible in an axial direction of the roller 13.

Although, in the above one-way clutch 10, components (state switching components) for switching between a lock state and a free state are rollers 13 as described below in the description of the operation of the one-way clutch, the components are not limited to the rollers 13. Operating portions of the roller 13 are The inner peripheral face of the outer ring 11 and the cam faces 12a of the inner ring 12, the inner peripheral faces and the cam faces 12a facing the wedge-shaped space.

Operation of the one-way clutch is described below.

First, in a case in which the outer ring 11 is driven to rotate only in one direction to cause the inner ring 12 to follow, each roller 13 is caused to roll toward the narrower side of the wedge-shaped space when a rotation speed of the outer ring 11 is increased. As a result, the rollers 13 are engaged between the outer ring 11 and the inner ring 12 and the inner ring 12 is integrated with the outer ring 11 and rotates synchronously with the outer ring 11. This state is referred to as a lock state.

However, if a rotation speed of the inner ring 12 becomes higher that of the outer ring 11 due to a decrease in the rotation speed of the outer ring 11, the roller 13 is caused to roll toward a wider side of the wedge-shaped space against a spring force of the spring 15 and starts to rotate on its own axis and the outer ring 11 and the inner ring 12 rotate with respect to each other. This state is referred to as a free state.

It is possible for the outer ring 11 to be rotated arbitrarily in opposite directions at different times. If the outer ring 11 rotates clockwise in FIG. 1, the clutch is brought into the above-described lock state in which the inner ring 12 rotates synchronously with the outer ring 11 in the same direction. If the outer ring 11 rotates counterclockwise in FIG. 1, the clutch is brought into the above-&scribed free state in which rotation power is not transmitted from the outer ring 11 to the inner ring 12. Only the outer ring 11 rotates, and the inner ring 12 does not rotate.

For the one-way clutch 10, a lubricant is prepared by mixing urea-based consistency increasing agent into ester-based or synthetic oil-based base oil, for example. Five to 20% by weight, and preferably 10 to 15% by weight of the urea-based consistency increasing agent is added. In addition, antioxidants, rust prevention additives, high pressure agents, and the like are added optionally.

As the base oil of the lubricant, one with a pressure viscosity coefficient of 12 $GPa^{-1}$ or more (preferably 16 $GPa^{-1}$ or more) at a temperature of 25° C. is selected. A ratio of the base oil and the consistency increasing agent which are mixed to prepare the lubricant is set such that a consistency is in a range of 240 to 310 (preferably 270 to 290) at a temperature of 25° C. A traction coefficient is 0.02 or more (preferably 0.04 or more) at a temperature of 25° C.

An engaging property and abrasion resistance of the one-way clutch 10 when various lubricants are used are evaluated in the experiment described below.

In this experiment, eight lubricants in total including Examples 1 to 4 shown in Table 1 and Comparative Examples 1 to 4 shown in Table 2 were prepared.

For the lubricants of Examples 1 to 4, the pressure viscosity coefficient of the base oil (at the temperature of 25° C.) was fixed at 12 $GPa^{-1}$ or more, the consistency of the lubricants (at the temperature of 25° C.) was fixed at 240 to 310, and the traction coefficient of the lubricants (at the temperature of 25° C.) was fixed at 0.02 or more.

For the lubricants of Comparative Examples 1 to 4, the base oil and the consistency increasing agent specified according to the present invention were used. For the lubricant of Comparative Example 1, the consistency and the traction coefficient are set at values out of the range of the invention. For the lubricant of Comparative Example 2, the pressure viscosity coefficient and the consistency were set at values out of the range of the invention. For the lubricant of Comparative Example 3, the traction coefficient was set at a value out of the range of the invention. For the lubricant of Comparative Example 4, the pressure viscosity coefficient was set at a value out of the range of the invention.

TABLE 1

| Example number | 1 | 2 | 3 | 4 |
|---|---|---|---|---|
| Base oil | ester | synthetic oil | synthetic oil | synthetic oil |
| Consistency increasing agent | urea | ← | ← | ← |

TABLE 1-continued

| Example number | | 1 | 2 | 3 | 4 |
|---|---|---|---|---|---|
| Base oil viscosity | 40° C. | 32 | 65 | 98 | 70 |
| | 100° C. | 6 | 8 | 12 | 22 |
| Pressure viscosity coefficient of the base oil | | 17.0 | 64.4 | 18.8 | 12.2 |
| Consistency | | 276 | 283 | 240 | 310 |
| Traction coefficient | | 0.044 | 0.056 | 0.023 | 0.066 |
| Performance evaluation | Engaging property | ○ | ○ | ○ | ○ |
| | Abrasion resistance | ○ | ○ | ○ | ○ |

TABLE 2

| Comparative Example number | | 1 | 2 | 3 | 4 |
|---|---|---|---|---|---|
| Base oil | | synthetic oil | ← | ← | ← |
| Consistency increasing agent | | urea | ← | ← | ← |
| Base oil viscosity | 40° C. | 40 | 378 | 80 | 33 |
| | 100° C. | 8 | 88 | 25 | 7 |
| Pressure viscosity coefficient of the base oil | | 14.5 | 4.0 | 13.0 | 10.9 |
| Consistency | | 236 | 330 | 244 | 293 |
| Traction coefficient | | 0.018 | 0.070 | 0.018 | 0.28 |
| Performance evaluation | Engaging property | Δ | ○ | X | Δ |
| | Abrasion resistance | ○ | X | Δ | Δ |

In the performance evaluation in the above tables, the engaging property was evaluated by checking a following state of rotation of the inner ring 12 with respect to rotation of the outer ring 11 in the lock state and in a low-temperature atmosphere (at −20° C. to −40° C.).

The abrasion resistance was evaluated by checking wearing states of the cam faces 12a of the inner ring 12 and an inner peripheral face of the outer ring 11 after operation in a high-temperature atmosphere (at 100° C. to 120° C.).

With regard to the engaging property, a mark ○ represents a case in which the rotation of the inner ring 12 stably followed the rotation of the outer ring 11. A mark Δ represents an unstable case in which the rotation of the inner ring 12 did not follow the rotation of the outer ring 11 frequently, and a mark X represents a case in which the rotation of the inner ring 12 did not follow the rotation of the outer ring 11.

With regard to the abrasion resistance, a mark ○ represents a case in which wear was hardly found, a mark Δ represents a case in which wear was found, and a mark X represents a case in which wear was extremely significant.

The result was that the engaging operation of the rollers 13 was smooth for a long time and significant wear was not generated in the rollers 13 and the cam faces 12a when the lubricants of Examples 1 to 4 were employed.

In contrast to the above examples, the engaging property decreased slightly in the case of the lubricant of Comparative Example 1. The abrasion resistance decreased significantly in the case of the lubricant of Comparative Example 2, and the engaging property decreased significantly in the case of the lubricant of Comparative Example 3.

Both the engaging property and the abrasion resistance decreased slightly in the case of the lubricant of Comparative Example 4.

The above results indicate that pressure resistance tends to increase to suppress generation of breakage of oil film if the pressure viscosity coefficient of the base oil (at the temperature of 25° C.) is set at 12 Gpa$^{-1}$ or more.

If the consistency (at the temperature of 25° C.) is set at 240 to 310, flowability tends to increase to enhance wearing suppression effect.

If the traction coefficient (at the temperature of 25° C.) is set at 0.02 or more, the rollers 13 are less likely to slip and the engaging property is excellent.

In the above-described one-way clutch 10, movement of the rollers 13 is stable even at a low temperature and members which the rollers 13 contact (the cam faces 12a of the inner ring 12 and the inner peripheral face of the outer ring 11) are less likely to wear even at a high temperature. This contributes to an enhancement of reliability of the clutch and an increase in life of the clutch.

The one-way clutch 10 can be built into pulleys of various auxiliary machinery mounted to an engine of an automobile or the like, for example. A specific example in which the one-way clutch 10 is incorporated into the pulley of an alternator as auxiliary machinery of the automobile is shown in FIG. 4. FIG. 4 is a vertical sectional side view of a pulley unit incorporating the one-way clutch.

In FIG. 4, a reference character A indicates a pulley unit. Pulley 1 is formed at an outer peripheral face thereof with a belt groove 1a in which a driving belt B is disposed. The rotary shaft 2 functions as an input shaft of the alternator. The rolling bearings 3, 3 are disposed on opposite sides in an axial direction in an annular space through which the pulley 1 and the rotary shaft 2 face each other and mainly bear a radial load. Both rolling bearings 3, 3, are formed as deep groove ball bearings.

In the pulley unit A in the example shown in FIG. 4, seal members 5 are mounted to only outer end sides of the two rolling bearings 3, 3 in an axial direction between the inner ring 12 and outer ring 11. By the two seal members 5, the one-way clutch 10 and the rolling bearings 3, 3 are sealed and a common lubricant is used for the one-way clutch 10 and the two rolling bearings 3, 3.

In the pulley unit A in the example shown in FIG. 4, the one-way clutch 10 is disposed in the annular space through which the pulley 1 and the rotary shaft 2 face each other. In this example, the outer ring 11 of the one-way clutch 10 is fitted into the pulley 1 by press-fit and the inner ring 12 of the one-way clutch 10 is fitted into the rotary shaft 2 by press-fit.

Such a pulley unit A is used in a state in which the pulley 1 is rotated in only one direction and a rotation speed of the pulley 1 is changed arbitrarily. The operation is similar to that of the one-way clutch 10 described above.

In other words, if the pulley 1 is rotated in a required direction by the belt B, the one-way clutch 10 is brought into the lock state. As the rotation speed increases. Power is transmitted from the pulley 1 to the inner ring 12 and the rotary shaft 2 substantially at a rate of 1 to 1.

However, if the rotation speed of the pulley 1 decreases temporarily after an increase in the rotation speed of the pulley 1, rotation speeds of the inner ring 12 and the rotary shaft 2 momentarily increase over the rotation speed of the pulley 1 due to rotational inertial forces. As a result, the one-way clutch 10 is brought into the free state to interrupt transmission of the rotation power from the pulley 1 to the rotary shaft 2.

Then, if the rotation speed of the pulley 1 exceeds the rotation speed of the rotary shaft 2 again, the one-way clutch 10 is again brought into the lock state, and as a result, the rotation power is transmitted from the pulley 1 to the rotary shaft 2.

As described above, even if the rotation speed of the pulley 1 increases and decreases (pulsation), the one-way clutch 10 is properly switched between the lock state and the free state to rectify the pulsation of the rotation speed of the pulley 1, thereby linearly transmitting the rotation to the rotary shaft 2. Also when the rotation speed of the pulley 1 is decreased, the one-way clutch 10 is brought into the free state to allow the rotary shaft 2 to be rotated at a high speed by the rotational inertial force of the rotary shaft 2 itself. Therefore, it is possible to improve power generation efficiency of the alternator.

Although the above pulley unit A frequently receives vibrations from an engine, the above-described specific lubricant is used for the one-way clutch 10, and therefore, the operation of the one-way clutch 10 is stabilized and the abrasion resistance of the one-way clutch 10 is enhanced for a long time. This contributes to enhancement of reliability and increase in life of the pulley unit A.

In the one-way clutch 10, the state switching component may be constructed of a sprag or other components instead of the rollers 13.

Leaf springs or elastic chips may be used instead of the coil springs 15.

Although the cam faces 12a of the one-way clutch 10 are formed on the inner ring side in the above embodiment, the present invention can be also applied to a one-way clutch 10 in which the cam faces 12a are formed on the outer ring 11 side. However, because the structure in which the cam faces 12a are formed on the inner ring 12 as in the above embodiment can prevent the rollers 13 from being detached unnecessarily from the locked positions due to a centrifugal force even in high-speed rotation, such a structure is suitable for usage in the high-speed rotation.

Preferred embodiments of the invention have been described. Various modifications are possible.

What is claimed is:

1. A one-way clutch comprising:
   an outer ring;
   an inner ring disposed inside said outer ring in a diameter direction and concentrically with said outer ring;
   a state switching component for switching between a lock state in which said outer ring and said inner ring are rotated synchronously with each other and a free state in which said outer ring and said inner ring are rotated with respect to each other; and
   a lubricant for lubricating an operating portion of said state switching component,
   wherein said lubricant is prepared by mixing a urea-based consistency increasing agent into ester-based or synthetic oil-based base oil with a pressure viscosity coefficient at a temperature of 25° C. set at 12 GPa$^{-1}$ or more.

2. The one-way clutch according to claim 1,
   wherein said outer ring and said inner ring are disposed such that a wedge-shaped space narrowing in one direction in a circumferential direction is formed between faces of said outer ring and
   said inner ring which face each other and said state switching component is disposed for rolling in said wedge-shaped space.

3. The one-way clutch according to claim 1,
   wherein a ratio of said base oil and said urea-based consistency increasing agent mixed to prepare said lubricant is set such that said lubricant has a consistency in a range of 240 to 310 at a temperature of 25° C. and a traction coefficient of 0.02 or more at a temperature of 25° C.

4. The one-way clutch according to claim 3, wherein 5 to 20% by weight of said urea-based consistency increasing agent is mixed.

5. The one-way clutch according to claim 3, wherein said lubricant comprises 10 to 15% by weight of said urea-based consistency increasing agent.

6. The one-way clutch according to claim 3, wherein said lubricant has a traction coefficient of 0.04 or more.

7. The one-way clutch according to claim 3, wherein said lubricant has a consistency of from 270 to 290 at a temperature of 25° C.

8. The one-way clutch according to claim 3, wherein said ester-based base oil or synthetic-based base oil has a pressure viscosity coefficient of 16 GPa$^{-1}$ or more at a temperature of 25° C.

9. A one-way clutch comprising:
   an outer ring;
   an inner ring disposed inside said outer ring and concentric with said outer ring;
   a locking component allowing said outer ring and said inner ring to alternate between a lock state in which said outer ring and said inner ring rotate together and a free state in which said outer ring and said inner ring rotate with respect to each other; and
   a lubricant for lubricating said locking component,
   wherein said lubricant is prepared by mixing a urea-based consistency increasing agent into an ester-based base oil having a pressure viscosity coefficient at a temperature of 25° C. of 12 GPa$^{-1}$ or more.

10. The one-way clutch according to claim 9,
    wherein said outer ring and said inner ring are disposed such that a wedge-shaped space narrowing in one direction in a circumferential direction is formed between faces of said outer ring and faces of said inner ring which face each other and said locking component is disposed for rolling in said wedge-shaped space.

11. The one-way clutch according to claim 9, wherein a ratio of said ester-based base oil and said urea-based consistency increasing agent is set such that said lubricant has a consistency of from 240 to 310 at a temperature of 25° C. and a traction coefficient of 0.02 or more at a temperature of 25° C.

12. The one-way clutch according to claim 11, wherein said lubricant comprises 5 to 20% by weight of said urea-based consistency increasing agent.

13. The one-way clutch according to claim 11, wherein said lubricant comprises 10 to 15% by weight of said urea-based consistency increasing agent.

14. The one-way clutch according to claim 11, wherein said lubricant has a traction coefficient of 0.04 or more.

15. The one-way clutch according to claim 11, wherein said lubricant has a consistency of from 270 to 290 at a temperature of 25° C.

16. The one-way clutch according to claim 11, wherein said ester-based base oil has a pressure viscosity coefficient of 16 GPa$^{-1}$ or more at a temperature of 25° C.

17. A one-way clutch comprising:
    an outer ring;
    an inner ring disposed inside said outer ring and concentric to said outer ring;
    a locking component allowing said outer ring and said inner ring to alternate between a lock state in which said outer ring and said inner ring rotate together and a free state in which said outer ring and said inner ring rotate with respect to each other; and a lubricant for lubricating said locking component, wherein said lubricant is prepared by mixing a urea-based consistency increasing agent into a synthetic oil-based base oil having a pressure viscosity coefficient at a temperature of 25° C. of 12 GPa$^{-1}$ or more.

18. The one-way clutch according to claim 17, wherein said outer ring and said inner ring are disposed such that a wedge-shaped space narrowing in one direction in a circumferential direction is formed between faces of said outer ring and faces of said inner ring which face each other and said locking component is disposed for rolling in said wedge-shaped space.

19. The one-way clutch according to claim 17, wherein a ratio of said synthetic oil-based base oil and said urea-based consistency increasing agent is set such that said lubricant has a consistency of from 240 to 310 at a temperature of 25° C. and a traction coefficient of 0.02 or more at a temperature of 25° C.

20. The one-way clutch according to claim 19, wherein said lubricant comprises 5 to 20% by weight of said urea-based consistency increasing agent.

21. The one-way clutch according to claim 19, wherein said lubricant comprises 10 to 15% by weight of said urea-based consistency increasing agent.

22. The one-way clutch according to claim 19, wherein said lubricant has a traction coefficient of 0.04 or more.

23. The one-way clutch according to claim 19, wherein said lubricant has a consistency of from 270 to 290 at a temperature of 25° C.

24. The one-way clutch according to claim 19, wherein said synthetic-based base oil has a pressure viscosity coefficient of 16 GPa$^{-1}$ or more at a temperature of 25° C.

25. A pulley unit comprising:

a pulley;

an outer ring disposed inside said pulley and concentric to said outer ring, said outer ring being fastened to said pulley such that they rotate together;

an inner ring disposed inside said outer ring and concentric to said outer ring;

a locking component allowing said outer ring and said inner ring to alternate between a lock state in which said outer ring and said inner ring rotate together, and a free state in which said outer ring and said inner ring rotate with respect to each other, whereby a rotating force applied to said pulley is transmitted to said inner ring while said inner ring and said outer ring are in the lock state; and a lubricant for lubricating said locking component, wherein said lubricant is prepared by mixing a urea-based consistency increasing agent into a synthetic oil-based base oil having a pressure viscosity coefficient at a temperature of 25° C. of 12 GPa$^{-1}$ or more.

26. The pulley unit according to claim 25, wherein said outer ring and said inner ring are disposed such that a wedge-shaped space narrowing in one direction in a circumferential direction is formed between faces of said outer ring and faces of said inner ring which face each other and said locking component is disposed for rolling in said wedge-shaped space.

27. The pulley unit according to claim 25, wherein a ratio of said synthetic oil-based base oil and said urea-based consistency increasing agent is set such that said lubricant has a consistency of from 240 to 310 at a temperature of 25° C. and a traction coefficient of 0.02 or more at a temperature of 25° C.

28. The pulley unit according to claim 27, wherein said lubricant comprises 5 to 20% by weight of said urea-based consistency increasing agent.

29. The pulley unit according to claim 27, wherein said lubricant comprises 10 to 15% by weight of said urea-based consistency increasing agent.

30. The pulley unit according to claim 27, wherein said lubricant has a traction coefficient of 0.04 or more.

31. The pulley unit according to claim 27, wherein said lubricant has a consistency of from 270 to 290 at a temperature of 25° C.

32. The pulley unit according to claim 27, wherein said synthetic-based base oil has a pressure viscosity coefficient of 16 GPa$^{-1}$ or more at a temperature of 25° C.

33. A pulley unit comprising:

a pulley;

an outer ring disposed inside said pulley and concentric to said outer ring, said outer ring being fastened to said pulley such that they rotate together;

an inner ring disposed inside said outer ring and concentric to said outer ring;

a locking component allowing said outer ring and said inner ring to alternate between a lock state in which said outer ring and said inner ring rotate together, and a free state in which said outer ring and said inner ring rotate with respect to each other, whereby a rotating force applied to said pulley is transmitted to said inner ring while said inner ring and said outer ring are in the lock state; and a lubricant for lubricating said locking component, a wherein said lubricant is prepared by mixing a urea-based consistency increasing agent into an ester-based base oil having a pressure viscosity coefficient at a temperature of 25° C. of 12 GPa$^{-1}$ or more.

34. The pulley unit according to claim 33, wherein said outer ring and said inner ring are disposed such that a wedge-shaped space narrowing in one direction in a circumferential direction is formed between faces of said outer ring and faces of said inner ring which face each other and said locking component is disposed for rolling in said wedge-shaped space.

35. The pulley unit according to claim 33, wherein a ratio of said ester-based base oil and said urea-based consistency increasing agent is set such that said lubricant has a consistency of from 240 to 310 at a temperature of 25° C. and a traction coefficient of 0.02 or more at a temperature of 25° C.

36. The pulley unit according to claim 35, wherein said lubricant comprises 5 to 20% by weight of said urea-based consistency increasing agent.

37. The pulley unit according to claim 35, wherein said lubricant comprises 10 to 15% by weight of said urea-based consistency increasing agent.

38. The pulley unit according to claim 35, wherein said lubricant has a traction coefficient of 0.04 or more.

39. The pulley unit according to claim 35, wherein said lubricant has a consistency of from 270 to 290 at a temperature of 25° C.

40. The pulley unit according to claim 35, wherein said ester-based base oil has a pressure viscosity coefficient of 16 GPa$^{-1}$ or more at a temperature of 25° C.

* * * * *